Aug. 14, 1923.
A. R. JOY
NUT LOCK
Original Filed Sept. 10, 1920
1,465,221
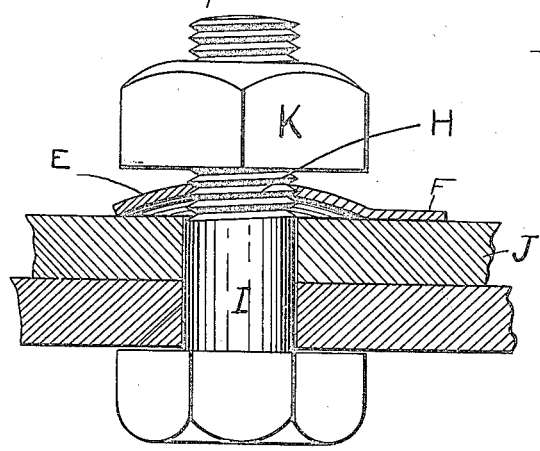
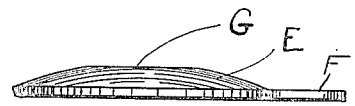
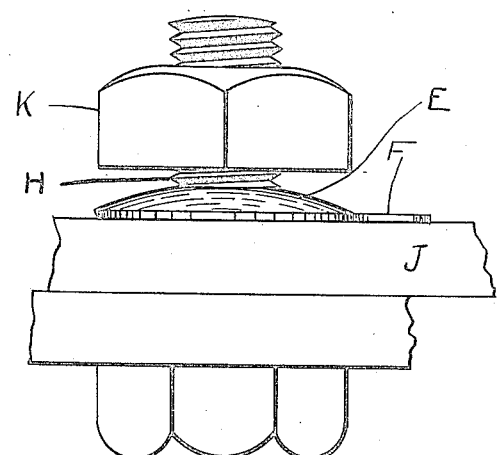
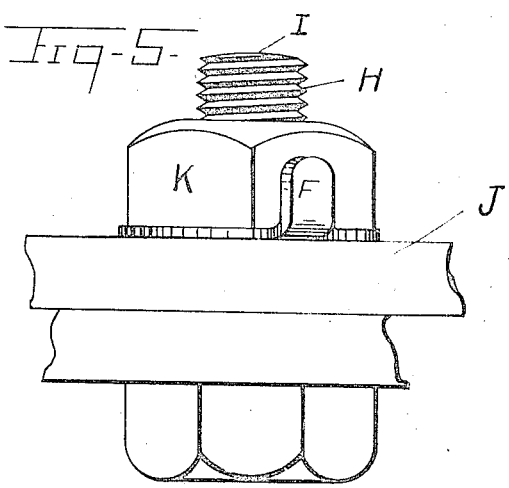
INVENTOR
Allan R Joy,
BY
ATTORNEY Patented Aug. 14, 1923.

1,465,221

UNITED STATES PATENT OFFICE.

ALLAN R. JOY, OF PORTLAND, OREGON.

NUT LOCK.

Application filed September 10, 1920, Serial No. 409,506. Renewed January 20, 1923.

*To all whom it may concern:*

Be it known that I, ALLAN R. JOY, a citizen of the United States and a resident of Portland, Multnomah County, State of Oregon, have invented a new and useful Improvement in Nut Locks, of which the following is a specification.

This invention relates generally to bolt-nuts and washers, and has particularly to do with improvements in the design and construction thereof, by means of which the nut is automatically and firmly locked in place, and is designed for all mechanical uses and purposes.

The main object of my invention is to provide an absolutely firm and secure lock for a nut, and to prevent the possibility of its becoming loose by reason of constant jar or exposure to the elements, and yet so simple that any inexpert person may use it.

A further object of my invention is to provide a washer with a locking lip which constitutes a further, or double lock for the nut.

The above objects I accomplish by the means and mechanism above described, and more fully shown in the accompanying drawings in which, Fig. 1 is a sectional view of my device, showing it in assembled form;

Fig. 2 is a side view of the washer showing locking tongue.

Fig. 3 is a plan view of washer, and tongue.

Fig. 4 is a side elevation.

Fig. 5 is a side elevation and shows completed construction of device, with lip or tongue F locked against nut.

In the present embodiment of my invention I provide a washer E which is dished or convex and made of malleable iron or other yielding material and has a central threaded bolt opening G the threads of said opening being adapted to fit closely into the threads H of the bolt I which may be of any design or construction.

The washer E is further provided with a lip or tongue F projecting laterally from the periphery of the washer, the purpose of which will be further pointed out.

In carrying the purpose of my invention into effect the washer is placed in proper position which is done by running it down on the threads of the bolt until the lower edge of the periphery rests on the fish plate or other base J on which the nut and bolt are used, the tongue F, which is flat lying close to the base and extending radially away from the washer as a whole.

The nut K is then turned down on the bolt and against the convexed portion. The continued turning down of the nut causes all portions of washer engaged in the threads of the bolt to be severed by pressure of the nut, the nut now engages in its threads the portions of the threads of the washer which have thus been severed and being forced into the bolt opening of the nut forms a choke or lock for the nut which will effectually prevent it having a retrograde movement by jar vibration or the usual strains to which such devices are commonly subjected.

As the threads of the washer are being forced into the nut as above set forth, the washer becomes flattened against the base J and thereby fastens it firmly to the bolt. The tongue or lip F is then turned up and against one of the side faces of the nut, as seen in Figure 5, and provides an additional or double lock for the nut which will never loosen.

I claim;

1. A nut lock comprising a threaded bolt, a bowed washer having a threaded opening at the center of the bow, the threads of the washer fitting closely in the threads of the bolt, a nut mounted on said bolt and having one face adapted to contact with the convex face of the washer, whereby longitudinal pressure of the nut against the washer will flatten the bow of the washer sever the threads of the same and force them outwardly into the threads of the nut and form a choke or lock.

2. A nut lock as set forth in claim 1, the bowed washer provided with a flat tongue or lip projecting laterally from its periphery adapted to be bent up and against a side face of the nut after the washer has been flattened by the nut.

ALLAN R. JOY.